United States Patent
Bradley

(10) Patent No.: US 10,006,952 B1
(45) Date of Patent: Jun. 26, 2018

(54) SYSTEM AND METHOD FOR REDUCING THE EFFECTS OF SPURS ON MEASUREMENTS USING AVERAGING WITH SPECIFIC NULL SELECTION

(71) Applicant: ANRITSU COMPANY, Morgan Hill, CA (US)

(72) Inventor: Donald Anthony Bradley, Morgan Hill, CA (US)

(73) Assignee: ANRITSU COMPANY, Morgan Hill, CA (US)

( * ) Notice: Subject to any disclaimer, the term of this patent is extended or adjusted under 35 U.S.C. 154(b) by 0 days. days.

(21) Appl. No.: 15/417,119

(22) Filed: Jan. 26, 2017

Related U.S. Application Data

(60) Provisional application No. 62/290,261, filed on Feb. 2, 2016, provisional application No. 62/287,341, filed on Jan. 26, 2016.

(51) Int. Cl.
| | |
|---|---|
| *G01R 27/02* | (2006.01) |
| *G01R 27/28* | (2006.01) |
| *G01R 35/00* | (2006.01) |
| *G06F 1/00* | (2006.01) |
| *G01R 1/00* | (2006.01) |

(52) U.S. Cl.
CPC ............ *G01R 27/28* (2013.01); *G01R 35/00* (2013.01); *G01R 1/00* (2013.01); *G06F 1/00* (2013.01); *G06F 2101/00* (2013.01)

(58) Field of Classification Search
CPC ......... G01R 1/00; G06F 1/00; G06F 2101/00; H03M 1/00; H03M 2201/00
See application file for complete search history.

(56) References Cited

U.S. PATENT DOCUMENTS

| | | | | |
|---|---|---|---|---|
| 4,554,517 A * | 11/1985 | Parniere | .................. | H03C 3/02 331/15 |
| 4,758,783 A * | 7/1988 | Danzeisen | ........... | G01R 23/173 324/76.23 |
| 5,524,281 A * | 6/1996 | Bradley | ................. | G01R 27/28 324/601 |
| 6,606,583 B1 * | 8/2003 | Sternberg | ............... | G01R 27/28 324/616 |

(Continued)

*Primary Examiner* — Jermele M Hollington
*Assistant Examiner* — Temilade Rhodes-Vivour
(74) *Attorney, Agent, or Firm* — Tucker Ellis LLP

(57) ABSTRACT

A method of eliminating spurs in measurements of an electrical response of a device under test (OUT) obtained uses a measurement instrument including a mixer and a receiver. The measurement instrument is configured to generate, via the mixer, an intermediate frequency (IF) signal for use by the receiver from a radio frequency (RF) signal and a local oscillator (LO) signal. Input is received from a user at the measurement instrument and includes start frequency and end frequency. Parameters for a frequency sweep are generated based on the input. A measurement for each frequency of the frequency sweep is calculated using averaging of a plurality of samples obtained at that frequency. Frequencies are identified within the frequency sweep at which spurs will occur due to the measurement instrument. The parameters for a frequency of the frequency sweep at which a spur will occur are modified so that a null for a measurement at the frequency falls on the spur.

12 Claims, 7 Drawing Sheets

(56) References Cited

U.S. PATENT DOCUMENTS 7,219,037 B2 * 5/2007 Pupalaikis ......... G01R 13/0272
                                                341/126
7,310,425 B1 * 12/2007 Benesty ................ H04M 9/082
                                                379/406.08

* cited by examiner

SYSTEM AND METHOD FOR REDUCING THE EFFECTS OF SPURS ON MEASUREMENTS USING AVERAGING WITH SPECIFIC NULL SELECTION

CLAIM OF PRIORITY

This application claims the benefit of priority to U.S. Provisional Application titled "AVERAGING WITH ARBITRARY BANDWIDTH AND SPECIFIC NULL SELECTION", Application No. 62/287,341, filed Jan. 26, 2016 and U.S. Provisional Application titled "NEAR INTERMEDIATE FREQUENCY (IF) VECTOR NETWORK ANALYZER (VNA) OPERATION SPUR ELIMINATION", Application No. 62/290,261, filed Feb. 2, 2016, which applications are herein incorporated by reference.

TECHNICAL FIELD

The present invention relates generally to instruments that measure the performance of electrical networks and devices, and more specifically to network analyzers for measuring scattering parameters.

BACKGROUND

A vector network analyzer (VNA) is a reflectometer-based electronic instrument that can be used to measure the frequency response (magnitude and phase) of a device under test (DUT) such as an electrical network, component, circuit, or sub-assembly. A VNA makes use of a frequency sweeping source or stimulus, directional couplers, and one or more receivers that provide ratioed amplitude and phase information such as reflection and transmission coefficients. VNAs commonly measure scattering (S-) parameters because reflection and transmission of electrical networks are relatively easy to measure at high frequencies. S-parameters describe the electrical behavior of linear electrical networks and devices when undergoing various steady state stimuli by electrical signals. VNAs are often used to characterize two-port networks such as amplifiers and filters, but they can be used on networks with an arbitrary number of ports.

SUMMARY

In accordance with an embodiment, a method of eliminating spurs in measurements of an electrical response of a device under test (DUT) obtained uses a measurement instrument including a mixer and a receiver. The measurement instrument is configured to generate, via the mixer, an intermediate frequency (IF) signal for use by the receiver from a radio frequency (RF) signal and a local oscillator (LO) signal. Input is received from a user at the measurement instrument and includes start frequency and end frequency. Parameters for a frequency sweep are generated based on the input. A measurement for each frequency of the frequency sweep is calculated using averaging of a plurality of samples obtained at that frequency. Frequencies are identified within the frequency sweep at which spurs will occur due to the measurement instrument. The parameters for a frequency of the frequency sweep at which a spur will occur are modified so that a null for a measurement at the frequency falls on the spur.

In accordance with a further embodiment, frequencies within the frequency sweep at which a crossover spur will occur are identified and the parameters are modified for a frequency of the frequency sweep at which a crossover spur will occur so that a frequency of the IF signal generated at the frequency is offset from a default frequency of the IF signal used in the frequency sweep.

In accordance with an embodiment, a system for eliminating spurs in measurements of an electrical response of a device under test (DUT) includes a measurement instrument including a mixer and a receiver. The measurement instrument is configured to generate, via the mixer, an intermediate frequency (IF) signal for use by the receiver from a radio frequency (RF) signal and a local oscillator (LO) signal. The system further includes a non-transitory computer readable storage medium having instructions stored thereon including instructions to receive input for generating a frequency sweep at the measurement instrument and generate parameters for the frequency sweep based on the received input, and modify the parameters for a frequency of the frequency sweep at which a spur will occur so that a null for a measurement at the frequency falls on the spur. The received input includes start frequency and end frequency. A measurement for each frequency of the frequency sweep is calculated using averaging of a plurality of samples obtained at that frequency, and frequencies are identified within the frequency sweep at which spurs will occur due to the measurement instrument.

BRIEF DESCRIPTION OF THE DRAWINGS

Further details of the present invention are explained with the help of the attached drawings in which.

DETAILED DESCRIPTION

The following description is of the best modes presently contemplated for practicing various embodiments of the present invention. The description is not to be taken in a limiting sense but is made merely for the purpose of describing the general principles of the invention. The scope of the invention should be ascertained with reference to the claims. In the description of the invention that follows, like numerals or reference designators will be used to refer to like parts or elements throughout.

It would be apparent to one of skill in the art that the present invention, as described below, may be implemented in many different embodiments of hardware, software, firmware, and/or the entities illustrated in the figures. Further, the frequencies given for signals generated and/or used, and the values for electronic components (e.g., resistors, capacitors, etc.) in the figures and description are merely exemplary. Any actual software, firmware and/or hardware described herein, as well as any frequencies of signals generated thereby and any values for electronic components, are not limiting of the present invention. Thus, the operation and behavior of the present invention will be described with the understanding that modifications and variations of the embodiments are possible, given the level of detail presented herein.

Figure 1:
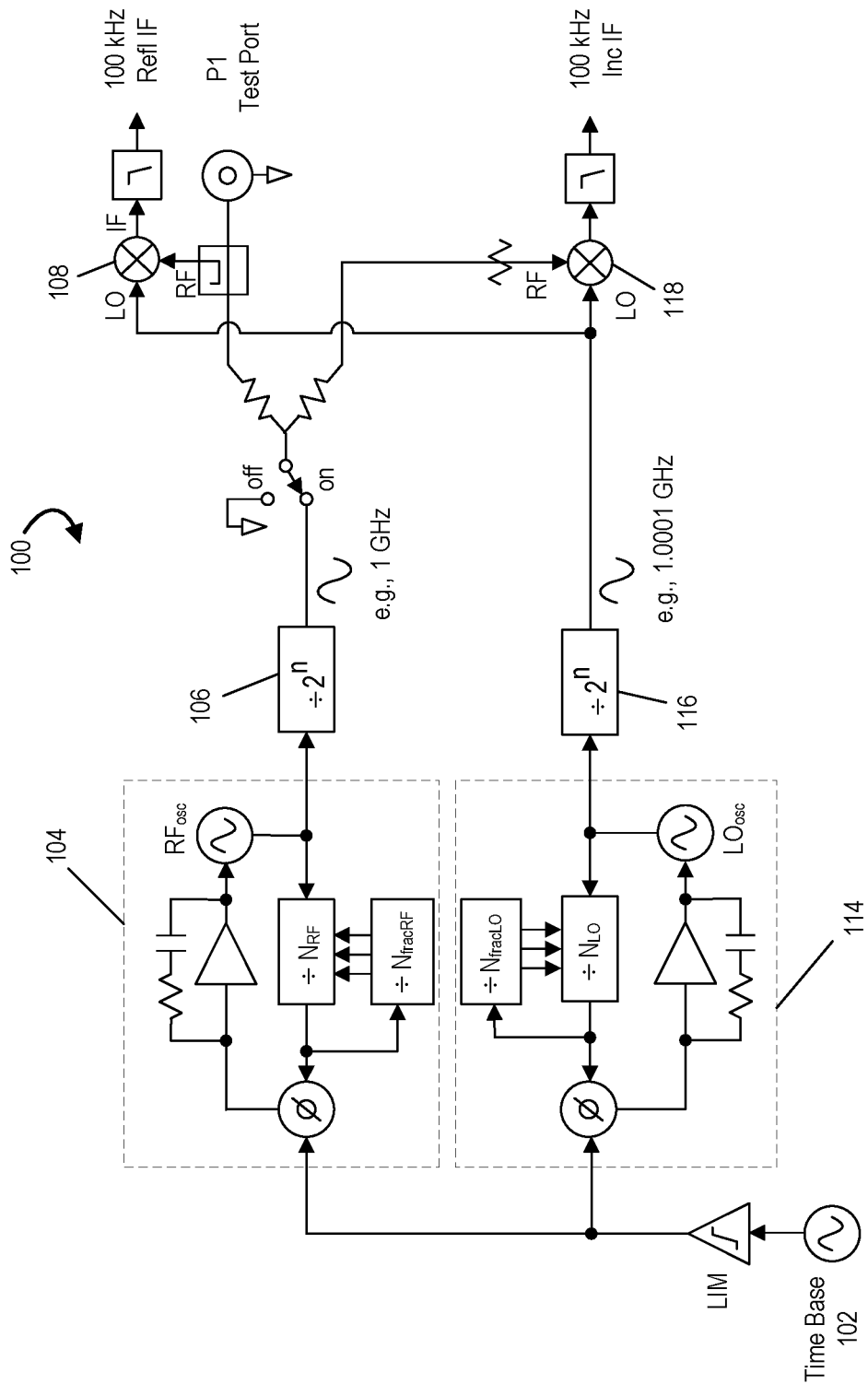
FIG. 1 is a simplified circuit diagram of a vector network analyzer (VNA) for measuring scattering parameters for a device under test (DUT).

FIG. 1 is a circuit diagram of a vector network analyzer (VNA) comprising a single port reflectometer 100 for measuring the electrical behavior of a device or network when the device or network is connected with a test port P1 as a device under test (DUT). The VNA comprises a radio frequency (RF) signal synthesizer and a local oscillator (LO) signal synthesizer. A time base signal source 102 generates a time base signal that synchronizes a reference signal ($RF_{osc}$) of the RF signal synthesizer and a reference signal ($LO_{osc}$) of the LO signal synthesizer via respective phase-locked loops (PLLs) 104, 114 to generate a RF output signal at the test port P1 and a LO signal for downconverting the RF output signal via a first mixer 118 to generate an incident intermediate frequency (IF) signal. As shown, the RE output signal has an exemplary frequency of 1 GHz, and the LO signal has an exemplary frequency of 1.0001 GHz. A reflected signal generated at the DUT and reflected back to the test port is coupled to a second mixer 108 and the LO signal is used to downconvert the reflected signal to generate a reflected IF signal.

Synchronization using the time base signal allows the first mixer to generate a resulting incident IF signal having a reliable frequency of 100 kHz at a known phase. A synchronous detector (see FIG. 2) samples the incident and reflected IF signals, from which a measurement of a scattering (S-) parameter is obtained for the DUT. The single port reflectometer, when used alone, can measure an S-parameter corresponding to the input port voltage reflection coefficient (also referred to as the S11 parameter). The single port reflectometer can measure magnitude and phase of the input port reflection coefficient.

As will be appreciated by one skilled in the art, where the single port reflectometer is used in combination with another reflectometer, or where the VNA is a two-port NINA, additional signals can be downconverted and measured to produce S21 and S22 signals. Likewise, additional ports can allow further measurements. For example, a four-port NINA connected with a four-port network can be used to obtain measurements for a 4×4 scattering matrix.

Figure 2:
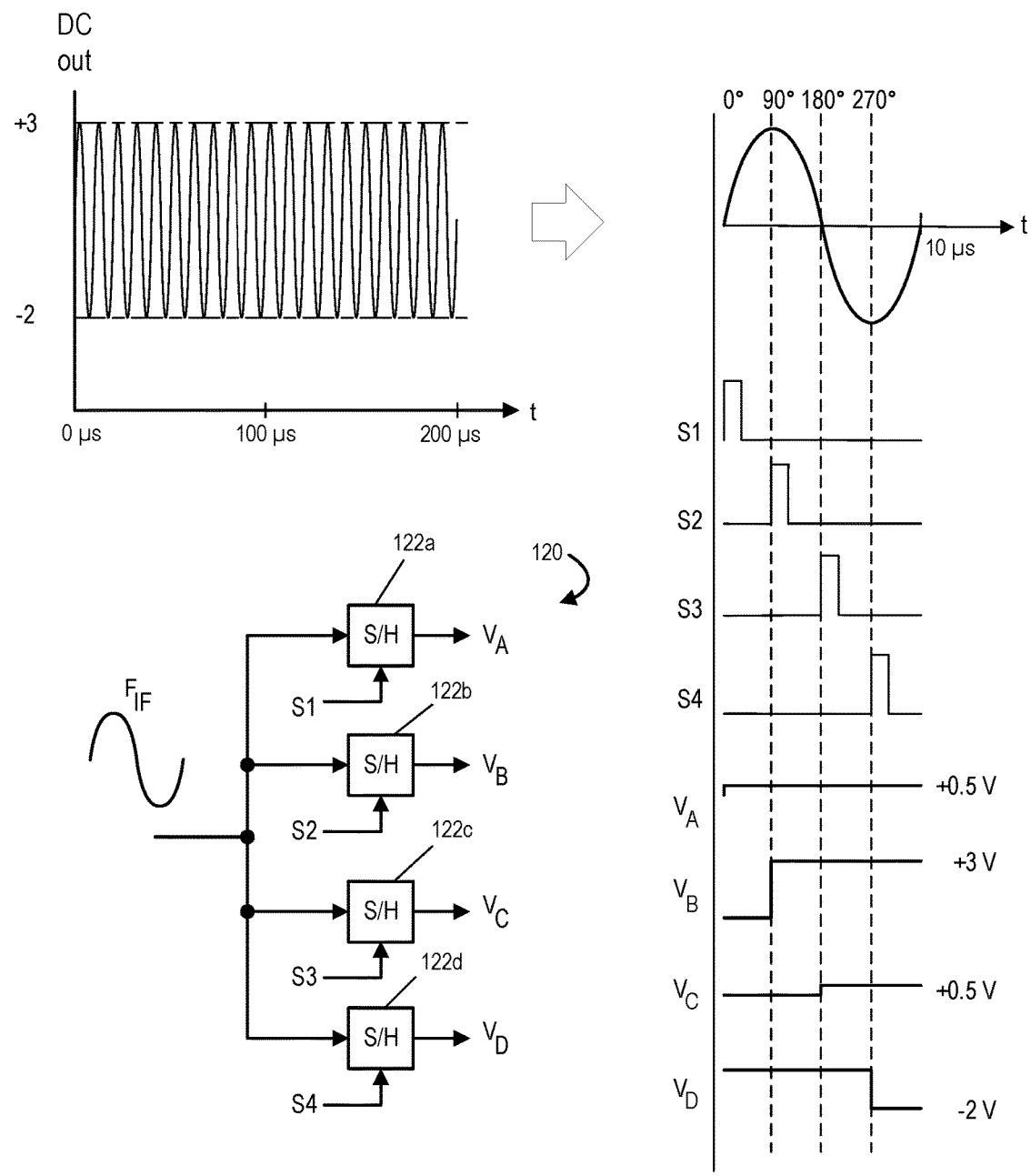
FIG. 2 illustrates a synchronous detector for use in a receiver of a VNA along with an expanded view showing sampling of a cycle of an IF signal by the synchronous detector.

FIG. 2 illustrates an IF signal and a synchronous detector 120 usable in a receiver for sampling an IF signal. In an embodiment, the IF signal will have a constant frequency, e.g. 100 kHz, and will vary in magnitude and phase with the RE signal entering a mixer. As the VNA executes a set of arbitrary test frequencies, stepping from a selected start frequency to a selected end frequency in intervals, the frequency of the LO signal will be adjusted at each interval so that the resulting IF signal has a frequency of 100 kHz.

As shown, the synchronous detector includes a set of four sample-and-hold (S/H) circuits (122a-122d), each triggered by a pulse (SI-S4) signaling the S/H circuits to sample the IF signal at each frequency interval and hold the sampled value at a constant level for a specified minimum period of time. As shown, the S/H circuits sample voltages $V_A$, $V_B$, $V_C$ and $V_D$ at 90 degree intervals. As used hereinafter, samples from a set of S/H circuit for a single period of the IF signal will be referred to as a single cycle sample set. At a frequency of 100 kHz for the IF signal, the pulses operate at a 400 kHz rate (i.e., every 2.5 μs).

In other embodiments, the synchronous detector can include, for example, additional S/H circuits sampling at different degree intervals along a cycle of the IF signal so that the single cycle sample set includes additional samples (e.g., 5 or 8 samples). A single cycle sample set of four samples enables simple calculation of magnitude and phase without using sine and cosine lookup tables, for example.

A synchronous detector allows measurement of both real and imaginary components of the IF signal to enable calculation of magnitude and phase using incident and reflected signals. Likewise, calculation of magnitude of transmitted signals received from other signal sources can be obtained and, where the receiver is synchronized with the source of the transmitted signals, calculation of phase of the transmitted signals can also be obtained.

For a single cycle sample set of four samples, magnitude can be calculated based on the sampled voltages using the formula $$Mag = \sqrt{\left(\frac{V_A - V_C}{2}\right)^2 + \left(\frac{V_B - V_D}{2}\right)^2}$$

Phase can be calculated based on the sampled voltages using the formula $$\phi = \tan^{-1}\frac{V_A - V_C}{V_B - V_D}$$

Referring to the exemplary sampled IF signal shown in FIG. 2, if $V_A$ is 0.5 V, $V_B$ is +3 V, $V_C$ is 0.5 V and $V_D$ is −2 V, the magnitude calculation, Mag, is 2.5 V, and the phase calculation, Φ, is 0°.

The number of cycle sample sets of the IF signal at a given frequency step can be selected by a user or determined based on the selected (or predefined) noise bandwidth of the set of arbitrary test frequencies. The calculations from the cycle sample sets are averaged to obtain a measurement, e.g., a1, b1, from which an S-parameter can be calculated, e.g., S11=b1/a1.

Referring again to FIG. 1, the RF synthesizer and the LO synthesizer each use an integer divider ($N_{RF}$, $N_{LO}$) and a fractional divider ($N_{fracRF}$, $N_{fracLO}$) to divide the respective reference signals to match the frequency of the time base signal. Respective PLLs match the phase of the reference signals to the phase of the time base signal using the divided reference signal. If the fraction applied by the fractional divider is a very small number, integer boundary spurs can generate within a synthesizer and propagate to the output of a mixer. The receiver will measure an effect of the spurs on the measurements and output the results, for example, to a display screen.

Figure 3:
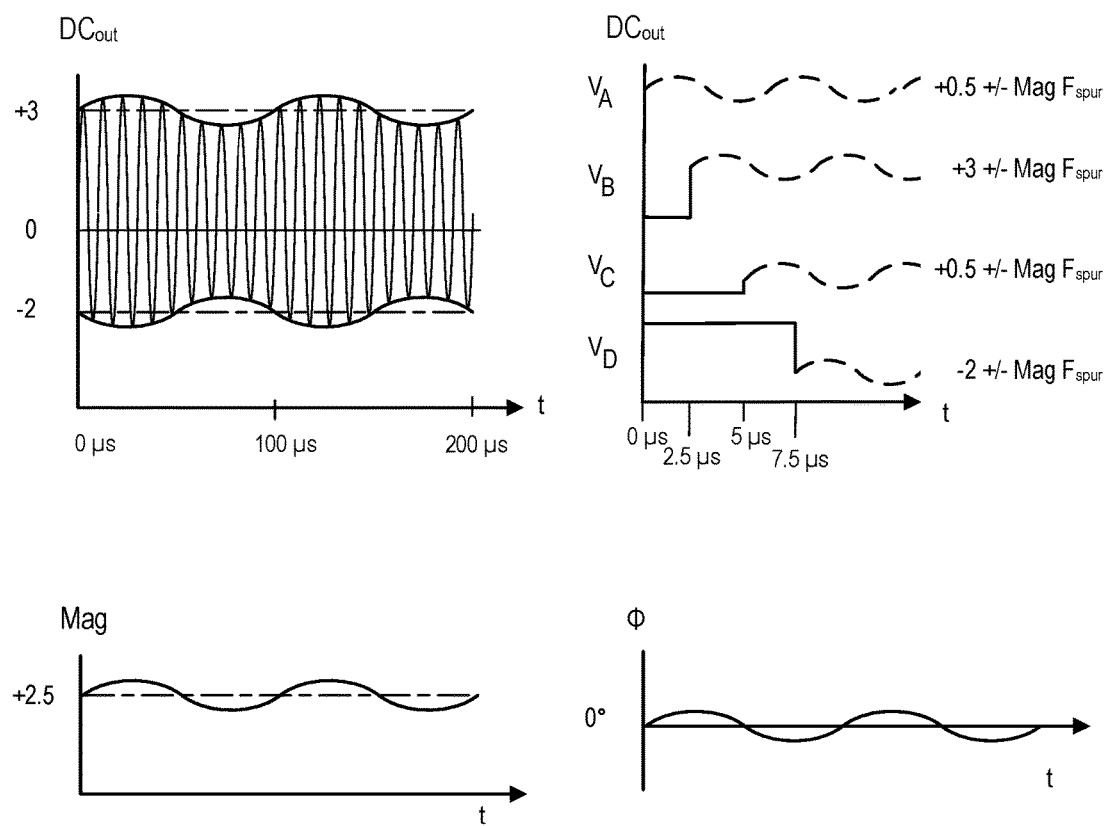
FIG. 3 illustrates an exemplary IF signal and spur with sampling by the synchronous detector along with resulting exemplary magnitude and phase measurements.

Referring to FIG. 3, an example is shown of the output of a mixer comprising an IF signal having a frequency of 100 kHz and an additional signal generated by a synthesizer having a frequency of 110 KHz causing a 10 kHz spur. The $DC_{out}$ voltage sampled by the S/H circuits will vary over the number of samples obtained producing voltage measurements that can vary. Likewise, phase measurements will vary. This variation can result in noise in the displayed measurements, which can cause problems with interpretation by a user.

In general, spur avoidance can be implemented by placing an interfering spur far outside an IF band pass. This forces an IF filter that is wider than necessary to accommodate the new IF frequency when a spur is present. This extra bandwidth allows excess noise into the analog-to-digital (A/D) converter as well as increased circularity errors in synchronous detection used in VNA receivers.

Integer boundary spurs generated within synthesizers can be avoided, for example, by changing the frequency of the time base signal so that the integer and fraction are changed. Alternatively, if the LO synthesizer is generating the spur, the frequency of the LO signal can be changed along with the frequency of the IF signal for the same RF frequency, without changing the time base signal, with the result being a change in the frequency of the IF signal, which can be adjusted for in the A/D converter.

However, if a spur is generated by the RF synthesizer and the frequency of the time base signal is not changed, a change in the frequency of the LO signal will not eliminate the spur and changing the frequency setting of the RF output signal will cause the set of arbitrary test frequencies to not be completed for each defined frequency step.

Embodiments of systems and methods in accordance with the present invention can be applied to eliminate or reduce the effect of spurs on measurement using averaging with specific null selection.

As described above, averaging can be used to reduce noise bandwidth in measurements using network analyzers, such as VNAs or scalar network analyzers (SNAs). The higher the number of cycle sample sets used in averaging, the lower the noise bandwidth. However, the presence of a spur can introduce noise to the averaging measurement.

Figure 4:
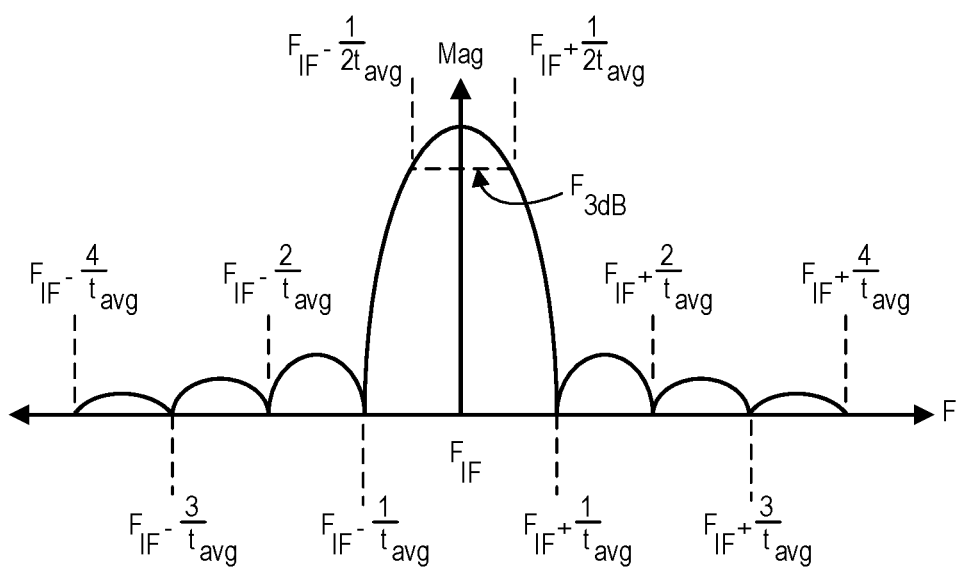
FIG. 4 is an exemplary sinc function for the IF signal of FIG. 3.

Referring to FIG. 4, simple averaging of data points results in a frequency response according to an unnormalized sine function plotted in the frequency domain and defined for x≠0 by $$\operatorname{sinc}(x) = \frac{\sin(x)}{x}$$

The frequency ($F_{3dB}$) for the selected or predefined 3 decibel (dB) noise bandwidth at the frequency of the IF signal is $$F_{3dB} = F_{IF} + \frac{1}{2t_{avg}} - \left(F_{IF} - \frac{1}{2t_{avg}}\right) = \frac{1}{t_{avg}}$$

or $+/-1/2t_{avg}$ centered at the frequency of the IF signal, where $t_{avg}$ is the average sample period.

Nulls appear at notch frequencies on either side of the intermediate frequency (IF). The first null appears at a frequency $$F_{null} = F_{IF} + \frac{1}{t_{avg}} - \left(F_{IF} - \frac{1}{t_{avg}}\right) = \frac{2}{t_{avg}}$$

or $+/-1/t_{avg}$ centered at the frequency of the IF signal, $F_{IF}$. Additional individual nulls (e.g., $2F_{null}$, $3F_{null}$, $4F_{null}$) appear at additional frequencies of $+/-1/t_{avg}$ (e.g., $F_{IF}+/-2/t_{avg}$, $F_{IF}+/-3/t_{avg}$, $F_{IF}+/-4/t_{avg}$, etc.).

The frequency of the IF signal, $F_{IF}$, determines the sample time, $t_s$, for a single period of the IF signal:

$$t_s = \frac{1}{F_{IF}}$$

The number of cycle sample sets ($N_{3dB}$) used in averaging for a given noise bandwidth for the frequency of the IF signal will be as follows:

$$N_{3dB} = \frac{t_{avg}}{t_s} \text{ or } \frac{F_{IF}}{F_{3dB}}$$

For a selection, n, of null, the number of averages for the selected null frequency starting at $+/-t_{avg}$ repeating every $+/-nt_{avg}$ is given by $$nN_{3dB} = \frac{(+/- nt_{avg})}{t_s} \text{ or } \frac{F_{IF}}{(+/- nF_{3dB})}$$

where n=1, 2, 3, 4, etc. Thus, a 1 ms average sample period ($t_{avg}$), for example, will produce a 3 dB noise bandwidth frequency of 1 kHz at 100 kHz and nulls at $+/-1$ kHz, $+/-2$ kHz, $+/-3$ kHz, etc.

Systems and methods in accordance with embodiments can enable independent IF bandwidth selection while rejecting known interfering signals. While systems and methods are described herein in the context of VNAs, they can be used in any application that applies signal averaging and notch frequencies simultaneously. Signal processing is transparent to a user (e.g., a technician) and can provide exact interfering signal notch and automatic notch applied to harmonics of an interfering signal.

In accordance with an embodiment, systems and methods can be applied to include nulls for spurs having frequency $F_{spur}$ for arbitrary bandwidth selection or other arbitrary input selection, such as cycle sample set size selection or frequency step size selection. For the purpose of identifying nulls for spurs, an integer number of periods for a given spur for the frequency of the IF signal can be obtained using $$N_{spur} = \frac{F_{IF}}{F_{spur}}$$

For the sake of example, an arbitrary input selection will be described as bandwidth selection. If $N_{3dB}$ is a factor of $N_{spur}$, then one of the recurring nulls will fall on $F_{spur}$. In accordance with an embodiment, a table or manifest of RF frequencies can be assembled identifying occurrences of spurs and identifying an adjusted number of cycle sample sets ($N_{3dBA}$) for a null which falls on the spur for a selected or predetermined noise bandwidth at those identified occurrences of spurs. A set of arbitrary test frequencies can be modified based on the adjusted number of cycle sample sets ($N_{3dBA}$). To identify a recurring null that will fall on each $F_{spur}$, the following calculations can be applied.

Calculation 1:

$$N_{3dB} = INT\left(0.5 + \frac{F_{IF}}{F_{3dB}}\right),$$

where INT is a floor function that returns the greatest integer less than or equal to the value it acts on.

Calculation 2:

$$N_{spur} = INT\left(0.5 + \frac{F_{IF}}{F_{spur}}\right)$$

If $N_{3dB} < N_{spur}$ then $N_{3dB} = N_{spur}$, else $N_{3dB}$=calculation 3.
Calculation 3:

$$N_{3dBA} = INT\left(0.5 + \frac{N_{3dB}}{N_{spur}}\right) * N_{spur}$$

Calculation 4:

$$F_{3dB} = \frac{F_{IF}}{N_{3dBA}}$$

For example, where $F_{IF}$=100 kHz $F_{spur}$=7.7 kHz, Table 1 lists results for a small set of exemplary frequencies for the 3 decibel (dB) noise bandwidth ($F_{3dB}$) for use in adjusting a set of arbitrary test frequencies for the RF frequency at which the spur occur.

TABLE 1

| F3dB | N3dB | Nspur | N3dBA | F3dBA |
|---|---|---|---|---|
| 1 | 100000 | 13 | 99996 | 1.00004 |
| 10 | 10000 | 13 | 9997 | 10.003 |
| 100 | 1000 | 13 | 1001 | 99.9001 |
| 300 | 333 | 13 | 338 | 295.858 |
| 500 | 200 | 13 | 195 | 512.8205 |
| 1000 | 100 | 13 | 104 | 961.5384 |
| 3000 | 33 | 13 | 39 | 2564.103 |
| 5000 | 20 | 13 | 26 | 3846.154 |
| 10000 | 10 | 13 | 13 | 7692.308 |

Thus, for the table above, if a F3 dB of 1000 Hz is selected, the set of arbitrary test frequencies will be adjusted to obtained 104 calculations, rather than 100 calculations. At 104 calculations, the null will fall on a spur when obtaining 104 calculations, and the 3 dB bandwidth frequency will be slightly shifted to 961.5384 Hz. The adjustment in calculations can be transparent to the user performing a frequency sweep while producing results where spurs are reduced or eliminated.

As described above, in other embodiments, inputs can include a start frequency, end frequency and an additional input other than frequency bandwidth, for example single cycle sample set size selection or frequency step size.

Figure 5:
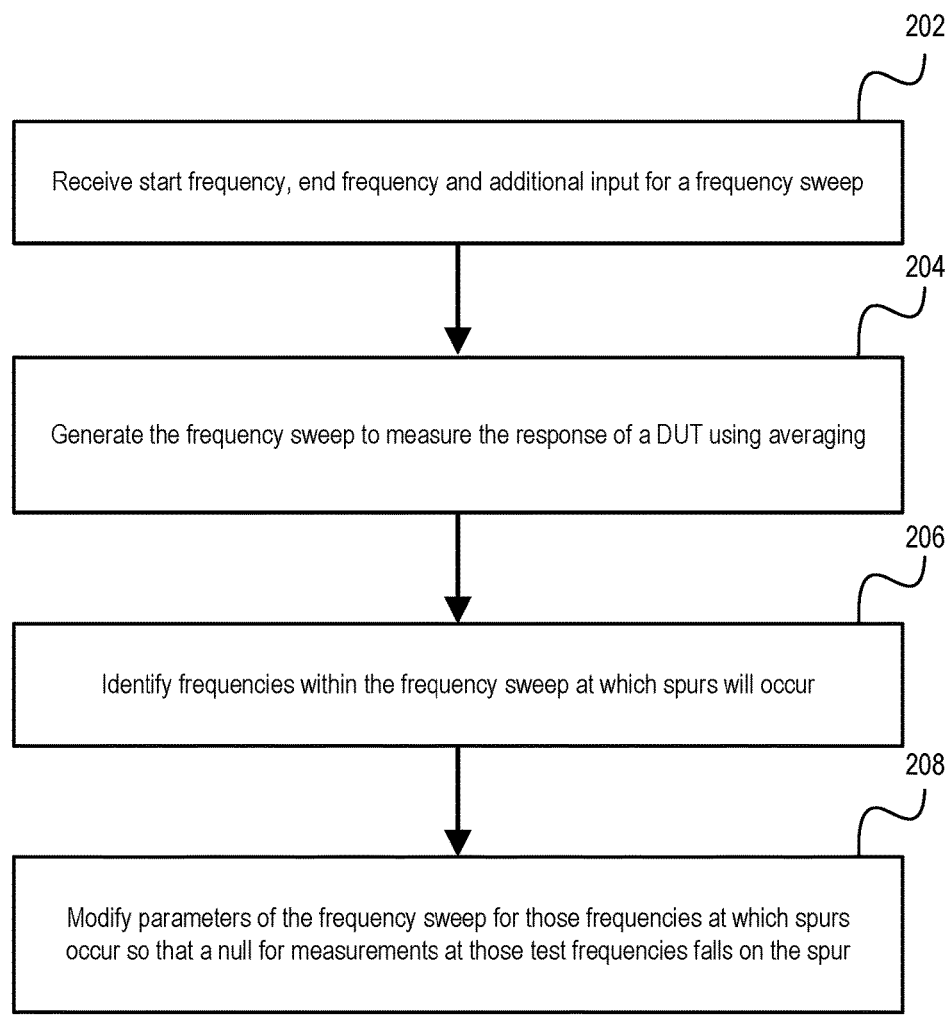
FIG. 5 is a flowchart for a method of reducing the effects of spurs on measurements using averaging with specific null selection, in accordance with an embodiment.

FIG. 5 is a flowchart of a method of reducing the effects of spurs on measurements using averaging with specific null selection, in accordance with an embodiment. The measurement instrument receives input from a user including at least a start frequency and an end frequency for a frequency sweep (Step 202). Additional input can include a frequency selected or predefined for the 3 decibel (dB) noise bandwidth a noise bandwidth. Alternatively, additional input can include, for example, a requested number of single cycle sample sets or a requested frequency delta between single cycle sample sets (i.e., frequency step size). A set of arbitrary test frequencies comprising a frequency sweep is then generated based on the input to measure DUT response to the frequency sweep using averaging (Step 204). Frequencies are then identified within the frequency sweep at which spurs will occur (Step 206). The synthesizers of the measurement instrument can be characterized to identify frequencies at which spurs will occur, or alternatively locations of spurs can be estimated based on calculation. Parameters of the frequency sweep are then modified for those test frequencies at which each spur will occur so that a null for measurements at those test frequencies falls on the spur (Step 208).

Spur Elimination for Network Analyzer Operation Near IF

For handheld measurement instruments, such as a handheld VNA, the size and weight of the measurement instrument must be taken into account and filters are typically eliminated for lack of space. Such instruments can comprise single conversion receivers that produce mixing spurs at low RF frequencies. The mixing spurs are produced by the LO and RF signals themselves mixing with each other, unlike the integer boundary spurs described above, which can be generated within synthesizers.

Figure 6:
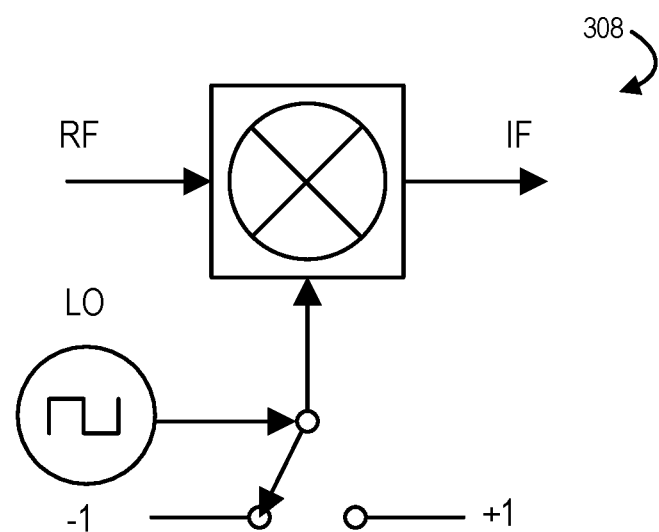
FIG. 6 is a simplified circuit diagram of a mixer for use with measurement instruments for downconverting a radio frequency (RF) signal with a square wave local oscillator (LO) signal.

Referring to FIG. 6, for a single conversion receiver with a tracking source there are close-in spurious responses when the frequency of a RF signal or LO signal is close to the frequency of the IF signal. For example, $F_{LO}$, $F_{RF}$<10 $F_{IF}$ mixers are driven with levels of drive at the LO port sufficient to cause the approximation of a switch. The waveform thus makes the mixer appear as a switch with a voltage of –/–1 driving a multiplier with a square wave. The multiplier thus has a multiplying function $$F_{LO} + \frac{3F_{LO}}{3} + \frac{5F_{LO}}{5} \ldots \text{etc., all odd harmonics}$$

When non-symmetry is included the multiplying function is $$F_{LO} + \frac{2F_{LO}}{2}K1 + \frac{3F_{LO}}{3} + \frac{4F_{LO}}{4}K2 + \frac{5F_{LO}}{5} \ldots \text{etc.,}$$

where $K$ is small

These mix products have no signal to mix with if the input RF is a pure sine wave. When the input signal is a square wave including some asymmetry, mixing spurs can be generated at certain frequencies of RF signals. The mixing spurs occur at low frequencies and start to disappear at higher frequencies, for example over about 1 MHz for mixers that are designed to generate IF signals of 100 kHz. An example of a spurious response is shown in Table 2.

TABLE 2

| Mix (N × M) | $F_{RF}$ | Level | dBc |
|---|---|---|---|
| 3 × 1 | $F_{IF}$ | 1 | 0 |
| 4 × 2 | 3/2 $F_{IF}$ | — | ≈ −30 |
| 5 × 3 | 2 $F_{IF}$ | 1/3 × 1/3 | −19 |
| 6 × 4 | 5/2 $F_{IF}$ | — | ≈ −30 |
| 7 × 5 | 3 $F_{IF}$ | 1/25 | −28 |
| 8 × 6 | 7/2 $F_{IF}$ | — | — |
| 9 × 7 | 4 $F_{IF}$ | 1/49 | −34 |
| 10 × 8 | 9/2 $F_{IF}$ | — | — |
| 11 × 9 | 5 $F_{IF}$ | 1/81 | −38 |
| 12 × 10 | 11/2 $F_{IF}$ | — | — |
| 13 × 11 | 6 $F_{IF}$ | 1/121 | −42 |
| 14 × 12 | 13/2 $F_{IF}$ | — | — |
| 15 × 13 | 7 $F_{IF}$ | 1/169 | −45 |
| 16 × 14 | 15/2 $F_{IF}$ | — | — |
| 17 × 15 | 8 $F_{IF}$ | 1/225 | −47 |
| 18 × 16 | 17/2 $F_{IF}$ | — | — |

TABLE 2-continued

| Mix (N × M) | $F_{RF}$ | Level | dBc |
|---|---|---|---|
| 19 × 17 | 9 $F_{IF}$ | 1/289 | −49 |
| 20 × 18 | 19/2 $F_{IF}$ | — | — |
| 21 × 19 | 10 $F_{IF}$ | 1/361 | −50 |

As shown, the mix of harmonics for the RF signal and LO signal is represented as N×M, with N being a harmonic of the RF signal and M being a harmonic of the LO signal. As shown, the fifth harmonic of the RF signal and the third harmonic of the LO signal (5×3) produce a spur at 19 decibels below carrier (dBc), which would appear large on a display of the measurement instrument.

The spur occurs at a frequency, $F_{spur}$, given by the formula $$F_{spur} = 5(F_{RF}) - 3(F_{LO})$$

For an RF frequency of 180 kHz and an LO frequency comprising a square wave at 280 kHz, the mixer produces an IF signal having a frequency of 100 kHz and a spur having a frequency of 5*(180 kHz)−3*(280 kHz), or 60 kHz. The output of the mixer is therefore an IF signal having a frequency of 100 kHz and a spur at 60 kHz.

Given the high noise level of the spur at the 5×3 mix, it would be desirable to eliminate the spur. The 5×3 mix is given below in Table 3 for RF signal frequencies ranging from 180 kHz to 220 kHz at increments of 5 kHz.

TABLE 3

| $F_{RF}$ | $F_{LO}$ | $F_{IF}$ | $F_{spur}$ | Δ spur | |
|---|---|---|---|---|---|
| 180 | 280 | 100 | 60 | −40 | |
| 185 | 285 | 100 | 70 | −30 | |
| 190 | 290 | 100 | 80 | −20 | |
| 195 | 295 | 100 | 90 | −10 | |
| 200 | 300 | 100 | 100 | 0 | Crossover spur |
| 205 | 305 | 100 | 110 | +10 | |
| 210 | 310 | 100 | 120 | +20 | |
| 215 | 315 | 100 | 130 | +30 | |
| 220 | 320 | 100 | 140 | +40 | |

As can be seen, the delta between the frequency of the spur and the frequency of the IF signal decreases and increases as the sweep progresses. At an RF signal frequency of 200 kHz, a crossover spur is produced at a frequency identical to the frequency of the IF signal. To apply methods as described above comprising averaging using measurements causing a null to fall on the spur, further embodiments include adjusting the frequency of the IF signal output by the mixer so that the spur is distanced from the frequency of the IF signal.

The method comprises changing the frequency of the IF signal in the vicinity of the spur by adjusting the frequency of the LO signal input to the mixer so that a frequency of the spur is distanced from the frequency of the IF signal. Changing the frequency of the IF frequency +/−10% increases the delta between the frequency of the spur and the IF frequency +/−40% as shown in Table 4.

TABLE 4

| $F_{RF}$ | $F_{LO}$ | $F_{IF}$ | $F_{spur}$ | Δ spur |
|---|---|---|---|---|
| 180 | 280 | 100 | 60 | −40 |
| 185 | 285 | 100 | 70 | −30 |
| 190 | 300 | 110 | 50 | −60 |
| 195 | 305 | 110 | 60 | −50 |
| 200 | 310/290 | 110/90 | 70/130 | −40/+40 |
| 205 | 295 | 90 | 140 | +50 |
| 210 | 300 | 90 | 150 | +60 |
| 215 | 315 | 100 | 130 | +30 |
| 220 | 320 | 100 | 140 | +40 |

As can be seen, there still remains a spur which will cause unstable measurements when a receiver is used as a downconverter in the measurement instrument. This is due to the nondeterministic nature of the phase of the spurious signal during calibration and measurement. Methods as described above in accordance with embodiments can then be applied to determine a simple variable notch frequency centered at the ΔF spur offset.

Systems and methods in accordance with embodiments can allow narrow IF pass band filtering and spur elimination. A spur avoidance algorithm can be applied to reduce or eliminate close in near IF spurs. Spurs can be eliminated with fast, real time calculation applying the algorithm to reduce noise by 10 Log # averages. The algorithm can further enable tracking of the spurs. In accordance with an embodiment, an algorithm can be implemented in software for use in a VNA, and can be applied for wide operation ranges, e.g. from 150 KHz to 6 GHz.

Averaging a signal will result in a frequency response following the sinc function resembling that of FIG. 4. For an exemplary case where the frequency of the IF signal is 100 kHz and the spur is 10 kHz away, averaging 10 cycles of 100 kHz or 100 μs samples will place the first sin (x)/x null at 10 kHz. The notch follows the offset spur and complete removal of the spur is accomplished. It is known where the spur is at all times due to the calculation of $F_{RF}$ and $F_{LO}$.

Figure 7:
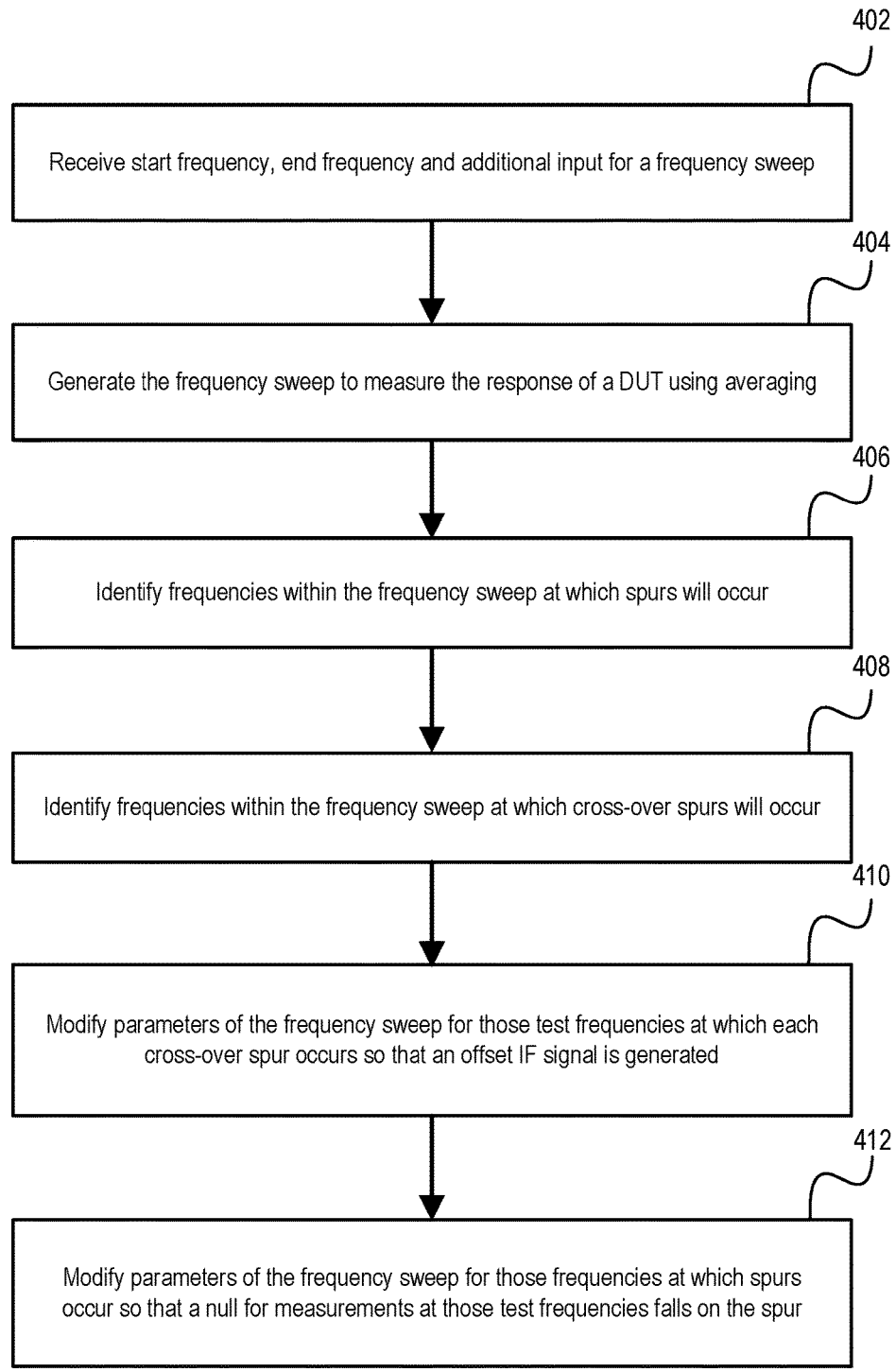
FIG. 7 is a flowchart for a method of reducing the effects of spurs on measurements by shifting the frequency at which the spur occurs and using averaging with specific null selection, in accordance with an embodiment.

FIG. 7 is a flowchart of a method of reducing the effects of spurs on measurements using averaging with specific null selection, in accordance with an embodiment. The measurement instrument receives input from a user including at least a start frequency and an end frequency for a frequency sweep (Step 402). Additional input can include a frequency selected or predefined for the 3 decibel (dB) noise bandwidth a noise bandwidth. Alternatively, additional input can include, for example, a requested number of single cycle sample sets or a requested frequency delta between single cycle sample sets (i.e., frequency step size). A set of arbitrary test frequencies comprising a frequency sweep is then generated based on the input to measure DUT response to the frequency sweep using averaging (Step 404). Frequencies are the identified within the frequency sweep at which spurs will occur (Step 406). Frequencies are then identified within the frequency sweep at which crossover spurs will occur (Step 408). The synthesizers of the measurement instrument can characterized to identify frequencies at which spurs will occur, or alternatively locations of spurs can be estimated based on calculation.

Parameters of the frequency sweep are then modified for those test frequencies at or near each crossover spur so that the LO signal generates a modified IF signal that has a frequency that is offset from the target frequency of the IF signal used as the default parameter of the frequency sweep so that the spur that was originally a crossover spur (and optionally nearby spurs) has a frequency that is offset from the frequency of the IF signal. The A/D clock is modified to compensate for the offset frequency of the modified IF signal (Step 410). Parameters of the frequency sweep are then modified for those test frequencies at which each spur will occur so that a null for measurements at those test frequencies falls on the spur (Step 412).

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

The invention claimed is:

1. A method of eliminating spurs in measurements of an electrical response of a device under test (DUT) obtained using a measuring instrument including a mixer and a receiver, wherein the measuring instrument is configured to generate, via the mixer, an intermediate frequency (IF) signal for use by the receiver from a radio frequency (RF) signal and a local oscillator (LO) signal, the method comprising:
   receiving input for generating a frequency sweep at the measuring instrument;
   wherein the received input includes start frequency and end frequency;
   wherein a measurement for each frequency of the frequency sweep is obtained by averaging of a plurality of samples obtained at that frequency;
   generating parameters for the frequency sweep, including a number of the plurality of samples obtained at each frequency of the frequency sweep, based on the received input;
   identifying frequencies within the frequency sweep at which spurs occur due to the measuring instrument; and
   modifying the parameters for an identified frequency of the frequency sweep at which a spur occurs so that a measurement for the identified frequency is obtained by averaging a plurality of samples for a selected null of a sinc function falling on the spur.

2. The method of claim 1, wherein a frequency of an IF signal used in the frequency sweep a default frequency, and further comprising:
   identifying frequencies within the frequency sweep at which a crossover spur will occur; and
   modifying the parameters for a frequency of the frequency sweep at which a crossover spur will occur so that a frequency of the IF signal generated at the frequency is offset from the default frequency.

3. The method of claim 1, wherein received input further includes a noise bandwidth or a number of samples.

4. The method of claim 1, wherein modifying the parameters for an identified frequency of the frequency sweep includes modifying the number of the plurality of samples obtained at the identified frequency.

5. A system for eliminating spurs in measurements of an electrical response of a device under test (OUT), comprising:
   a measuring instrument including a mixer and a receiver, wherein the measuring instrument is configured to generate, via the mixer, an intermediate frequency (IF) signal for use by the receiver from a radio frequency (RF) signal and a local oscillator (LO) signal;
   a non-transitory computer readable storage medium having instructions stored thereon which when executed cause the measuring instrument to perform a frequency sweep on a device under test (DUT), the instructions including
      receiving input for generating a frequency sweep at the measuring instrument,
      wherein the received input includes start frequency and end frequency,
      wherein a measurement for each frequency of the frequency sweep is obtained by averaging of a plurality of samples obtained at that frequency,
      generating parameters for the frequency sweep, including a number of the plurality of samples obtained at each frequency of the frequency sweep, based on the received input;
      identifying frequencies within the frequency sweep at which spurs will occur due to the measuring instrument, and
      modifying the parameters for an identified frequency of the frequency sweep at which a spur occurs so that a measurement for the identified frequency is obtained by averaging a plurality of samples for a selected null of a sinc function falling on the spur.

6. The system of claim 5, wherein a frequency of an IF signal used in the frequency sweep a default frequency, and
   wherein the non-transitory computer readable storage medium has instruction stored thereon which when executed cause the measuring instrument to perform a frequency sweep on a device under test (DUT), the instructions including
      identifying frequencies within the frequency sweep at which a crossover spur will occur; and
      modifying the parameters for a frequency of the frequency sweep at which a crossover spur will occur so that a frequency of the IF signal generated at the frequency is offset from the default frequency.

7. The system of claim 5, wherein received input further includes a noise bandwidth or a number of samples.

8. The system of claim 5, wherein modifying the parameters for an identified frequency of the frequency sweep includes modifying the number of the plurality of samples obtained at the identified frequency.

9. A non-transitory computer readable storage medium having instructions stored thereon which when executed cause a measuring instrument including a receiver and a mixer configured to generate an intermediate frequency (IF) signal for use by the receiver from a radio frequency (RF) signal and a local oscillator (LO) signal to perform a frequency sweep on a device under test (DUT), the instructions comprising:
   receiving input for generating a frequency sweep at the measuring instrument;
   wherein the received input includes start frequency and end frequency;

wherein a measurement for each frequency of the frequency sweep is obtained by averaging of a plurality of samples obtained at that frequency;

generating parameters for the frequency sweep, including a number of the plurality of samples obtained at each frequency of the frequency sweep, based on the received input;

identifying frequencies within the frequency sweep at which spurs will occur due to the measuring instrument; and modifying the parameters for an identified frequency of the frequency sweep at which a spur occurs so that a measurement for the identified frequency is obtained by averaging a plurality of samples for a selected null of a sinc function falling on the spur.

10. The non-transitory computer readable storage medium of claim 9, having instructions stored thereon which when executed cause the measuring instrument to perform a frequency sweep on a device under test (DUT), the instructions further including identifying frequencies within the frequency sweep at which a crossover spur will occur; and modifying the parameters for a frequency of the frequency sweep at which a crossover spur will occur so that a frequency of the IF signal generated at the frequency is offset from the default frequency.

11. The non-transitory computer readable storage medium of claim 9, wherein received input further includes a noise bandwidth or a number of samples.

12. The non-transitory computer readable storage medium of claim 9, wherein modifying the parameters for an identified frequency of the frequency sweep includes modifying the number of the plurality of samples obtained at the identified frequency.

* * * * *